United States Patent

[11] 3,597,979

| [72] | Inventor | Etienne Bonnet |
| | | Boussens, France |
| [21] | Appl. No. | 25,730 |
| [22] | Filed | Apr. 6, 1970 |
| [45] | Patented | Aug. 10, 1971 |
| [73] | Assignee | Entreprise de Recherches et d'Activites |
| | | Petrolieres (ELF) |
| | | Paris, France |
| [32] | Priority | Apr. 10, 1969 |
| [33] | | France |
| [31] | | 6910998 |

[54] METERING VALVE FOR INTRODUCING A FLUID UNDER PRESSURE INTO AN ANALYTICAL APPARATUS
9 Claims, 1 Drawing Fig.

| [52] | U.S. Cl. | 73/422 |
| [51] | Int. Cl. | G01h 1/00 |
| [50] | Field of Search | 73/422 GC, 23.1; 220/3; 137/606 |

[56] References Cited
UNITED STATES PATENTS

| 3,421,857 | 1/1969 | Reichle et al. | 73/422 |
| 3,166,939 | 1/1965 | Koeller et al. | 73/422 |
| 3,483,754 | 12/1969 | Chambers | 73/422 |

Primary Examiner—S. Clement Swisher
Attorney—Cameron, Kerkam & Sutton

ABSTRACT: Metering valve in which the metering volume is defined within a passage which is pierced in a movable slide-block and closed by a stationary pintle and a movable pintle. The slide-block is urged towards the movable pintle by an elastic system and is stopped by an abutment so that the movement of withdrawal of the movable pintle has the effect of opening the metering passage in proximity to the stationary pintle and permits the discharge of the fluid dose, then puts the passage into communication with the inlet.

Ducts for the flow of a scouring fluid are pierced in the slide-block around the metering passage and are closed by the abutment during introduction of the fluid to be metered.

Patented Aug. 10, 1971 3,597,979
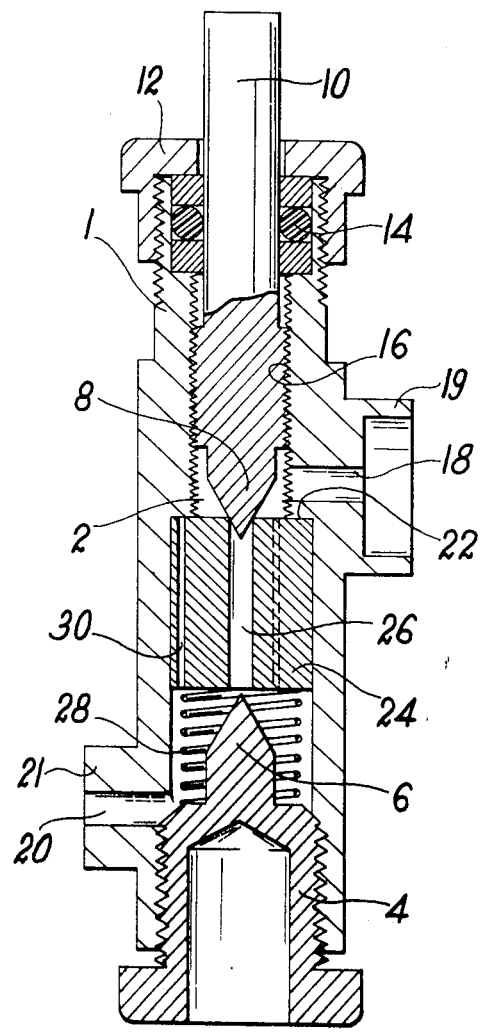

METERING VALVE FOR INTRODUCING A FLUID UNDER PRESSURE INTO AN ANALYTICAL APPARATUS

Instrumental analysis of fluids requires very high quantitative precision and this is one of the reasons for which gas chromatography is being employed to an increasing extent. However, the degree of precision obtainable is influenced by operating conditions which are not infrequently related to the quality of the equipment employed and also by a number of other factors, one of the most important of which appears to be the representative introduction of the sample to be analyzed.

In fact, a considerable hazard is attached to the conditions of pressure and temperature of the fluid in that they are liable to be modified while a sample is being obtained and introduced into the analytical apparatus; and when the pressure and temperature are relatively high, the sample under analysis is liable to differ from the original to a marked extent. Moreover, it is necessary to ensure:

that the manner in which the sample is introduced should enable this latter to arrive at the top of the analytical column in as "compact" a form as possible since there is a substantial loss in efficiency of analysis if the gas or vaporized liquid is not admitted into the column in this form;

that the volume of the sample should be small since an excessive volume would be liable to result in overloading of the column and therefore in modification of the retention volumes and that, in addition, said volume should be as reproducible as possible.

In the present state of the art, this introduction of samples is usually carried out either by means of a valve equipped with a sampling loop of known volume or by means of a hypodermic syringe.

The first system referred to undoubtedly permits of better reproducibility of samples, but it cannot be considered in either of these systems that the sample which is obtained and introduced into the analytical apparatus is really representative.

In point of fact, the analysis of gases under pressure gives rise to difficult problems from the point of view of quantity determination of the heavy hydrocarbon content. This determination may sometimes be disregarded but can also require to be performed with the maximum degree of precision in some special cases such as accurate control of the operation of a gas-processing plant or quantity determination of gasoline which is recovered in the vapor phase of a differential liberation of condensate gas.

The present invention is intended to meet these requirements by providing a metering valve which serves to introduce a fluid under pressure into an analytical apparatus and which, while maintaining the collected sample under conditions of temperature and pressure which are similar to those of the fluid circuit from which the sample was taken, permits accurate metering of said sample and consequently accurate reproduction of this latter.

This invention is directed to a metering valve comprising a tubular body which is closed at one end by a stationary pintle and at the other end by a movable pintle, said valve body being provided between said pintles with a fluid inlet and a fluid outlet, a trap which is traversed by a central metering passage and slidably fitted within said valve body, said trap being applied against the stationary pintle by means of the movable pintle and also applied against an internal abutment forming part of said valve body by means of an elastic system.

According to another property of the invention, said valve comprises means for guiding the movable pintle during the displacement thereof between a position of valve opening and fluid penetration and a position in which the trap is applied against the stationary pintle so as to isolate the dose of fluid to be analyzed.

In a preferred embodiment, the trap is pierced by longitudinal ducts for the flow of a valve-scouring fluid, said ducts being closed when said trap is applied in contact with the abutment which forms part of the valve body.

This invention is also concerned with a method analytical metering and introducing samples by means of the valve aforesaid or any like means. Said method consists after draining the valve in introducing the fluid to be analyzed into the whole of the interior of the valve, in shutting off the valve and isolating a predetermined quantity of fluid within a trap, in sweeping the valve around said trap by means of a solvent or a neutral gas until complete removal of the fluid to be analyzed which was present outside said trap, in connecting the valve to the analytical apparatus, in introducing a carrier gas and in opening the trap, the sample to be analyzed being passed into the analytical apparatus practically instantaneously by means of said carrier gas.

The sample is thus introduced into the interior of the central passage of the trap and enclosed within this latter without being either compressed, decompressed, heated or cooled. The sample is then impelled very rapidly by means of a carrier gas which is chemically neutral with respect to the gas within the analytical apparatus. These conditions and characteristics have not been modified.

Moreover, since the central passage has a well-determined dimension and volume, the samples which are taken subsequently will have exactly the same values. The ease with which scouring is carried out prior to and after metering in fact limits the fluid which is introduced strictly to the dose which is isolated in the trap.

This valve also has small dimensions which permit weighing prior to and after filling of the metering passage.

A number of further advantages and properties of the invention will in any case become apparent from the following description of one exemplified embodiment which is given without limitation and illustrated in longitudinal cross section in the single FIGURE of the accompanying drawings.

Said valve comprises a body 1 having preferably the shape of a square-base prism in which is pierced a central bore 2 and which is closed at the lower end by an endpiece 4 forming a pintle or centering cone 6, said endpiece being screwed into the body 1 and maintained stationary with respect to this latter. The valve body 1 is closed at the upper end by a second pintle cone 8 having an extension in the form of a rod 10 which is adapted to pass freely through a plug 12, said plug being screwed on said valve body and adapted to compress a packing-gland seal 14 against the rod 10 so as to permit the leaktight displacement of this latter. Above the cone 8, said rod 10 forms a nut 16 which is screwed into an internally threaded portion of the bore 2.

The valve body 1 is also pierced by an inlet 18 which is located beneath the pintle cone 2 and also by an outlet 20 which is adjacent to the pintle cone 6. The inlet 18 and outlet 20 are provided respectively with an extension in the form of a nozzle 19, 21 which permits the separable connection of the inlet duct 18 either to the circulation system containing the fluid to be analyzed or to a carrier fluid circuit and permits the separable connection of the outlet duct 20 either to the analytical apparatus or to a fluid discharge pipe. Said two nozzles (19 and 21) also make it possible to mount a plurality of valves in series on a suitable support bracket. Between these two ducts, that is to say between the two pintle cones 6 and 8, the valve body is provided with an annular shoulder 22 which projects so as to form an internal abutment against which a cylindrical trap 24 is intended to be applied in the position of the valve which is shown in the FIGURE. Said trap is pierced by a central bore 26 and urged against the abutment 22 by means of a spring 28 which is placed around the pintle cone 6.

The trap 24 is also provided at its periphery with longitudinal ducts 30 of small diameter and which may be three in number, for example. Said ducts have their openings on the two opposite faces of the trap which are closed as the trap comes into contact with the abutment shoulder 22.

In the position shown in the FIGURE, the pintle 8 has been moved down against the inlet of the passage 26 and shuts off this latter whilst the spring 28 applies the trap 24 against the abutment shoulder 22 and thus also shuts off the ducts 30.

Before carrying out a sample-taking operation with a view to passing the sample into the analyzing device, the pintle 8 is moved upwards by unscrewing the nut 16 and the valve is drained through the discharge pipe which is connected to the outlet 20. The ducts 30 are closed as the trap 24 comes into contact with the abutment shoulder 22 under the action of the spring 28; on the other hand, the metering passage 26 is opened.

The duct 18 is then connected to the circuit of the fluid to be analyzed which penetrates into the interior of the valve and in particular through the passage 26. When the valve body is filled, the pintle 8 is lowered by screwing and applies the trap 24 against the stationary pintle 6. The passage 26 is thus closed at both ends and the fluid contained therein is accordingly isolated and enclosed, thus forming the sample which is to undergo analysis.

By virtue of the fact that said fluid has flowed freely into the valve and has not been subjected to any compression or expansion, said fluid is present within the passage 26 under the same conditions as in the circulation system. The pressure and temperature of the fluid remain unchanged whilst the volume is well known since it corresponds to the capacity of the passage 26. If necessary, the valve can be isolated and weighed for the purpose of checking the weight of the sample.

In addition, the passage 26 is tightly closed by means of the pintle cones 6 and 8. It is therefore possible to connect the inlet 18 to a source of carrier fluid, that is to say a fluid which is neutral with respect to the fluid to be analyzed, e.g. petroleum either. As it penetrates into the valve, said carrier fluid sweeps the valve completely and passes out through the discharge circuit which is connected to the outlet 20. Since the trap is tightly applied against the pintle cone 6, the ducts 30 are open and the sweep fluid passes freely into the valve. This sweeping action is continued until there no longer remains within the valve any trace of fluid to be analyzed.

This cleaning or scouring operation can be checked if necessary by means of an instrument for monitoring the outlet fluid.

When the valve has thus been scoured and there remains within the interior only the sample which is enclosed within the passage 26, the valve is isolated both from the two sources of fluid and from the analytical apparatus. The valve is dried with compressed air and heated in an oven to a moderate temperature. The valve is again connected to the source of carrier gas which flows through the valve while this latter is heated, for example on a support bracket which is fitted with resistance-type heater elements, up to the temperature which is desired in order to bring the trap 24 and the sample to the temperature of the fluid circuit.

Once the temperature is stabilized, the 26 20 is connected to the analyzing device which may be a chromatographic apparatus and the pintle 8 is lifted. The metering passage 26 is thus opened and the carrier gas which is admitted through the inlet 18 penetrates therein and passes the sample of fluid to be analyzed towards the outlet 20. The introduction of the sample into the analytical column takes place practically instantaneously.

Since the sample is strictly limited by the dimensions of the metering passage and no trace of fluid to be analyzed remains in the valve, identical samples can readily be produced as many times as may prove necessary. Moreover, the sample is always exactly under the same conditions as in the circulation system form which it has been taken.

A large number of injections of pure substances which have been carried out by means of this valve at pressures of up to 200 kg./cm.$^2$ have shown that the reproducibility of samples was really excellent.

Furthermore, the valve is of very small overall size and also has a very low weight (of the order of 35 g.). The valve can thus be readily weighed, with the result that the mass of the sample can be determined with precision.

The valve aforesaid permits the regulated supply of samples of variable volume by making it possible to vary the dimensions of the trap both in respect of the length of this latter and the diameter of the central passage.

For example, it has proved possible to take samples ranging from 5 to 31 microliters with traps having a length of 6 or 10 mm. and pierced by a central passage having a diameter of 1 to 2 mm.

As is readily apparent, a number of different modifications could be made in the embodiment which has just been described without thereby departing either from the scope or the spirit of the invention.

What I claim is:

1. A metering valve for the introduction of a fluid under pressure into an analytical apparatus, wherein said valve comprises a tubular body which is closed at one end by a stationary pintle and at the other end by a movable pintle, said valve body being provided between said pintles with a fluid inlet and a fluid outlet, a trap which is transversed by a central metering passage and slidably fitted within said valve body, said trap being applied against the stationary pintle by means of the movable pintle and also applied against an internal abutment forming part of said valve body by means of an elastic system.

2. A metering valve according to claim 1, wherein said valve comprises means for guiding the movable pintle during the displacement thereof between a position of valve opening and fluid penetration and a position in which the trap is applied against the stationary pintle so as to isolate the dose of fluid to be analyzed.

3. A valve according to claim 2, wherein the trap is pierced by longitudinal ducts for the flow of a valve-scouring fluid, said ducts being closed when said trap is applied in contact with the abutment which forms part of the valve body.

4. A valve according to claim 3, wherein provision is made for three ducts located at uniform intervals on the periphery of the trap.

5. A valve according to claim 1, wherein the movable pintle has an extension in the form of a rod which is adapted to pass through a plug for sealing the extremity of the valve, said rod being slidably fitted within said plug and surrounded by a packing-gland seal.

6. A valve according to claim 1, wherein the abutment is constituted by an internal shoulder of the cylindrical valve body.

7. A method of metering and introducing samples into an analytical apparatus by means of a valve according to claim 1, wherein said method consists after draining the valve in introducing the fluid to be analyzed into the whole of the interior of said valve, in shutting off the valve and isolating a predetermined quantity of fluid within a trap, in sweeping the valve around said trap by means of a neutral fluid until complete removal of the fluid to be analyzed which was present outside said trap, then after having connected the valve to the analytical apparatus in introducing a carrier gas and in opening the trap, the sample to be analyzed being passed into the analytical apparatus practically instantaneously by means of said carrier gas.

8. A method according to claim 7, wherein the valve is swept by the carrier gas and heated before being connected to the analytical apparatus.

9. A method according to claim 7, wherein the isolated valve is drained and weighed after isolation of the metered sample.